G. F. TADINI.
VEHICLE WHEEL.
APPLICATION FILED JAN. 20, 1913.
1,083,709.
Patented Jan. 6, 1914.
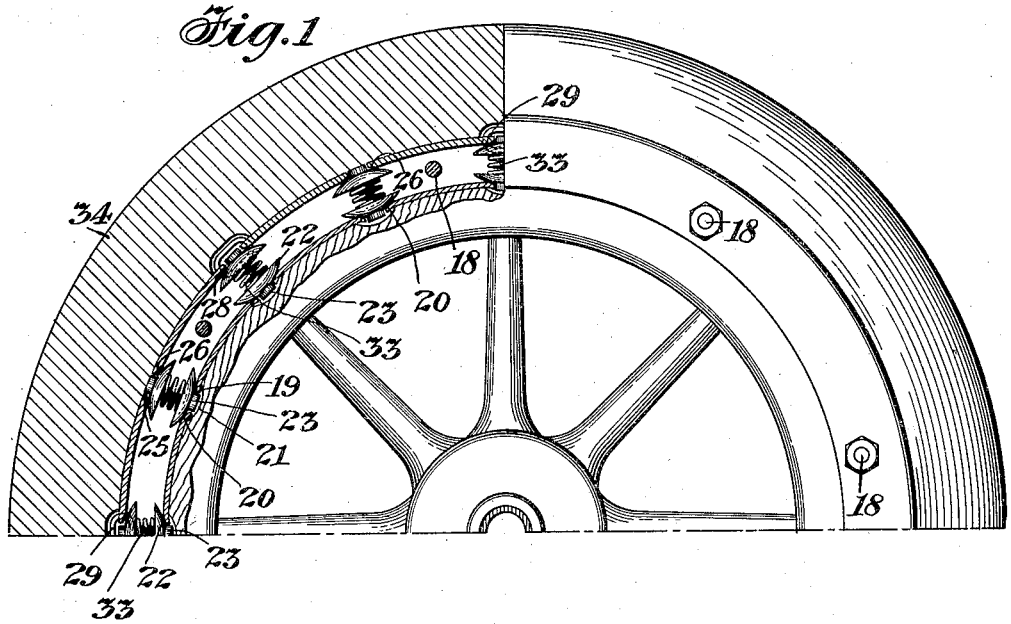
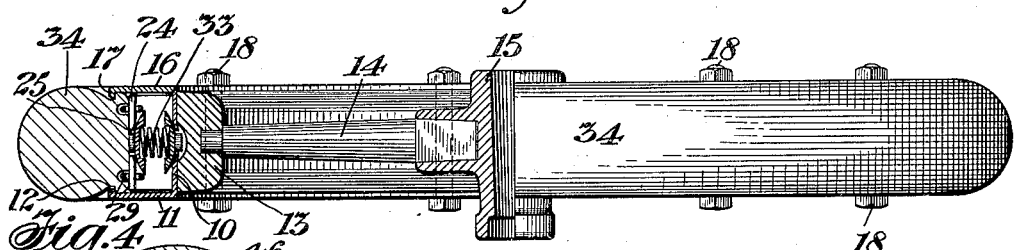
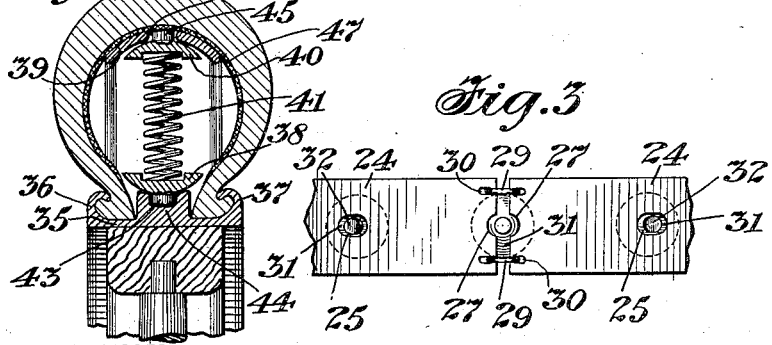
WITNESSES
Chas. F. Clagett
Bertha M. Allen
INVENTOR,
Jerome F. Tadini
BY
HIS ATTORNEYS.

UNITED STATES PATENT OFFICE.

GEROME F. TADINI, OF NEW YORK, N. Y.

VEHICLE-WHEEL.

1,083,709. Specification of Letters Patent. Patented Jan. 6, 1914.

Application filed January 20, 1913. Serial No. 742,985.

*To all whom it may concern:*

Be it known that I, GEROME F. TADINI, a citizen of the United States, residing in the borough of Bronx, city and State of New York, have invented an Improvement in Vehicle-Wheels, of which the following is a specification.

My present invention relates to vehicle wheels, and particularly to the tire member of vehicle wheels, the object thereof being the provision in a vehicle wheel of a mechanical structure of sufficient resiliency to be a substitute for the pneumatic tires which are now commonly employed in wheels used for a like purpose.

I am aware that heretofore various devices have been employed between the tire or tread of a vehicle wheel and the rim thereof in an effort to make the same resilient, helical springs, in some instances, having been employed for this purpose. So far as I am aware, however, there has been no relative movement between the parts of such devices, except that which is permitted through the spring or other resilient devices themselves, and for this reason such devices have generally been unsatisfactory because they only absorb the vibrations to a limited extent.

In carrying out my invention, I preferably employ a circular plate adapted to be secured to the rim of a wheel, a plurality of segments connected to one another to form a circular plate and spaced from the aforesaid plate, pluralities of cup members, in pairs, the respective members of each pair being journaled in the said plates, and springs or other resilient devices extending between and connecting each pair of the said cups. The construction is such that the cups are free to turn predetermined distances in all directions in the bearings in the said plates, and the tread or tire proper preferably extends over the plate formed of the segmental members, all of which will be hereinafter more particularly described.

In the drawing, Figure 1 is an elevation and partial central cross section of a vehicle wheel embodying my present invention. Fig. 2 is a plan and partial cross section of the same. Fig. 3 is a partial plan of a circular plate formed of segmental members, and Fig. 4 is a transverse section illustrating a modified form of my invention.

Referring to the drawing, and particularly to Figs. 1 to 3, inclusive, 10 designates a circular plate, which may be made of sheet metal or any other suitable material, and is provided at one side with a flange or side plate 11, which, as shown, may be integral with the plate 10, or as will be understood, may be secured to it in any desired manner, and the side plate 11 is provided with an inturned end as indicated at 12. The circular plate 10 is adapted to fit over the rim 13 of a vehicle wheel, the spokes of which are indicated at 14, and the hub at 15. It will be understood, however, that the vehicle wheel may be of any desired construction. Opposite the side plate 11, I employ a plate 16, which, similarly to the plate 14, is provided with an inturned edge 17, and the plates 16 and 17 may be connected by means of a series of bolts 18, as indicated, or otherwise. In suitably spaced and predetermined positions the circular plate 10 is provided with a series of holes 19 immediately adjacent to each of which the plate 10 is provided with concave surfaces 20 forming bearings, and in the rim 13, beneath each of the holes 19, is a recess indicated at 21. I also provide a plurality of cup shape members 22, each having a pin or lug extending centrally from its outer surface, and each one of these cup shape members is adapted to fit and turn on one of the concave surfaces 20 in the ring 10 with the pin 23 extending into the hole 19, the recess 21 being provided so that the pin 19 will not contact with any portion of the rim 13 but will have free access to move in all directions therein, being limited only by the sides of the plate in which the hole 19 is made. I also employ a plurality of segmental plates, each of which is indicated at 24. Each of these plates is provided centrally with a hole 25 and a concave surface 26, similar in all respects to the holes 19 and the concave surfaces 20 in the plate 10. At the end of each of the segmental plates 24, I provide a recess 27, and those portions of each plate adjacent to the recess 27 have concave surfaces indicated at 28, and the segmental plates 24 are connected, as indicated, by links 29 passing through elongated holes 30 placed in each plate adjacent to its end, it being understood, however, that the segmental plates may be connected by any suitable means which will give them a relative movement between themselves. I also employ a plurality of cup shape members 31, and each of these, similarly to the cup shape members 22, is provided with a pin 32 extending centrally from its outer surface. The cup shape members 22 and 31 are employed in pairs and extending between each pair of these cup shape members is a spring 33, or other resilient device.

From the drawing, it will be understood that the segmental plates 24 are of such a length as to extend between a predetermined number of the holes 19 in the plate 10, so that certain pairs of the cup shape members 22 and 31 are employed at these points, the cup shape members 31 in these pairs having bearings in the concave surface 28 at the adjacent ends of the segmental plates 24, the pin of each of these cup shape members 31 extending into the recesses 27 therein, the cup shape member being free to turn in all directions on these concave surfaces, and being limited only by the sides of the transverse plates in which the recesses 27 are provided.

In the drawing, I have illustrated one pair of the cup shape members 22—31 between each of the aforesaid pairs of these cup shape members, at the ends of the segmental plates, but as will be understood, I may employ any number of these intermediate pairs of cup shape members, and in each of them the cup shape member 31 is free to turn on its concave surface 26 with its pin 32 extending through the hole 25 in the segmental plate in connection with which it is employed. Exteriorly of the ring or plate formed of the segmental plates 24, I employ a tire indicated at 34, which is secured in position around the segmental plates 24 and between the side plates 11 and 16 by the inturned ends 12 and 17, respectively, of these latter named plates. It will be understood, however, that while I have shown a solid tire in Figs. 1 and 2 of the drawing, any form of tire may be used without departing from the spirit of my invention.

Referring to Fig. 4, it will be seen that my invention is applicable for use in connection with the shoes which are now ordinarily employed as a part of pneumatic tires for motor vehicle wheels. In this form of the invention, 35 indicates a circular plate adapted to fit over and be secured to the rim of a wheel, 36 and 37 the side plates, 38 one of the cup members provided with a pin 43, adapted to extend into a recess formed in the circular rib 44, formed on the plate 35, the cup shape member 38 being adapted to turn in all directions in a recessed bearing surface provided therefor in the rib 44. 39 designates a segmental plate, and 40 a cup shape member having a pin 45 adapted to extend through a hole 46 in the segmental member 39, the cup shape member 40 being free to turn in all directions on the bearing surface provided therefor in the segmental member 39. It is to be understood that the segmental member 39 is composed of a plurality of plates suitably connected in the same or similar manner as that hereinbefore described in connection with the segmental members 24.

Extending between the cup shape members 38 and 40 is a helical or other spring 41. It will be understood that while in this figure I have shown but one pair of cup shape members with their connecting spring, and but one of the segmental plates, I employ a plurality of these members, whose construction, function and relationship is the same as that hereinbefore described in connection with Figs. 1 to 3, inclusive. In this form of the invention, it may be necessary to employ a lining of canvas or other similar fabric between the inner surface of the shoe, indicated at 47, and the segmental plates 39.

I claim as my invention:

1. In a vehicle wheel, a plate adapted to surround and to be secured to the rim and having a plurality of holes therein and adjacent concave bearing surfaces, a plurality of segmental plates, means for connecting the adjacent ends of the segmental plates to form an auxiliary rim thereof, the said segmental plates being provided with a plurality of holes and adjacent concave bearing surfaces, corresponding in number and radial alinement with the said holes and bearing surfaces in the said plate, a plurality of cup-shaped members employed in pairs, a projection on each cup-shaped member and a spring extending between and connecting each pair of cup shaped members, each pair of cup-shaped members and their intervening spring extending between the said plate and auxiliary rim with the cup-shaped members seated in corresponding concave bearing surfaces and the projections thereon respectively extending into the said holes in the plate or auxiliary rim.

2. In a vehicle wheel, a plate adapted to surround and to be secured to the rim and having a plurality of holes therein and adjacent concave bearing surfaces, a plurality of segmental plates, each being provided with a recess at its ends and adjacent concave surfaces, and intermediate holes and adjacent concave surfaces, a plurality of cup shape members employed in pairs, a pin on each cup shape member, and a spring extending between the cup shape members forming each pair thereof, certain pairs of the cup shape members and their springs extending between the said plate and the ends of the segmental plates, and the remaining pairs of cup shape members and their springs extending between the said plate and the segmental plates intermediate of the aforesaid pairs of cup shape members, each of the cup shape members being seated in concave surfaces in the said plate and segmental plates, with the pins thereon extending into the holes in the said plate and segmental plates.

3. In a vehicle wheel, a plate adapted to surround and to be secured to the rim and having a plurality of holes therein and adjacent concave bearing surfaces, a plurality of segmental plates, each being provided with a recess at its ends and adjacent concave surfaces, and intermediate holes and adjacent concave surfaces, links connecting the ends of the segmental plates, a plurality of cup shape members employed in pairs, a pin on each cup shape member, and a spring extending between the cup shape members forming each pair thereof, certain pairs of the cup shape members and their springs extending between the said plate and the ends of the segmental plates, and the remaining pairs of cup shape members and their springs extending between the said plate and the segmental plates intermediate of the aforesaid pairs of cup shape members, each of the cup shape members being seated in concave surfaces in the said plate and segmental plates, with the pins thereon extending into the holes in the said plate and segmental plates.

Signed by me this 30th day of December, 1912.

GEROME F. TADINI.

Witnesses:
BERTHA M. ALLEN,
J. B. LE BLANC.

Copies of this patent may be obtained for five cents each, by addressing the "Commissioner of Patents, Washington, D. C."